United States Patent [19]

Hammond

[11] 4,395,530

[45] Jul. 26, 1983

[54] CATALYST INITIATED PREPOLYMER SYSTEMS

[75] Inventor: James A. Hammond, Redlands, Calif.

[73] Assignee: Colamco, Inc., Columbus, Ohio

[21] Appl. No.: 325,315

[22] Filed: Nov. 27, 1981

Related U.S. Application Data

[63] Continuation of Ser. No. 200,199, Oct. 24, 1980, abandoned.

[51] Int. Cl.³ ................... C08G 18/24; C08G 18/12
[52] U.S. Cl. ................................. 528/48; 528/44; 528/53; 528/54; 528/55; 528/74; 528/75
[58] Field of Search ............... 528/44, 53, 48, 54, 528/55, 74, 75

[56] References Cited

U.S. PATENT DOCUMENTS

| 2,650,212 | 8/1953 | Windemuth | 260/75 |
| 2,692,873 | 10/1954 | Langerak | 260/77.5 |
| 2,801,648 | 8/1957 | Anderson et al. | 138/74 |
| 3,196,026 | 7/1965 | Menard et al. | 106/287 |
| 3,814,736 | 6/1974 | Gibier-Rambaud et al. | 260/77.5 AC |
| 3,919,173 | 11/1975 | Coyner et al. | 260/77.5 AT |
| 3,980,594 | 9/1976 | Fabris et al. | 260/25 AC |
| 3,993,652 | 11/1976 | Bechara et al. | 260/268 BF |

Primary Examiner—H. S. Cockeram
Attorney, Agent, or Firm—Blakely, Sokoloff, Taylor & Zafman

[57] ABSTRACT

A process for the manufacture of a polyurethane prepolymer adhesive by a catalyst initiated reaction of polyol and isocyanate copolymers is performed under room temperature conditions, and in convenient quantities for application, storage, and transportation purposes. Compounding includes alternatives of catalyst and co-catalyst combinations, and additives, including a reaction inhibitor, plasticizer, delayed reaction catalyst and surfactant.

30 Claims, No Drawings

CATALYST INITIATED PREPOLYMER SYSTEMS

This is a continuation of application Ser. No. 200,199, filed Oct. 24, 1980 and now abandoned.

BACKGROUND OF THE INVENTION

1. Field of the Invention

The present invention relates generally to a process for the catalyst initiated reaction of polyol and isocyanate compounds, for the manufacture of polyurethane prepolymer adhesive under room temperature conditions and in convenient quantities for application in industry.

2. Prior Art

Previously polyurethane prepolymerized adhesive has been manufactured by the general method of mixing suitable polyol, isocyanate, and additive compounds, such as fire retardants and plasticizers, in a large industrial capacity reaction kettle, and maintaining the mixture in a sealed reaction kettle within a high temperature range until the reaction has gone to completion, generally 2 to 4 hours. The temperature range will depend upon the polyol and isocyanate reacted, but temperatures frequently must be maintained between 175° F. and 185° F. Heating systems are required to initiate the reaction, but since the reaction is highly exothermic, cooling systems are also required to prevent undesirable side reactions. Large, expensive reaction kettles are required in order for the process to generate sufficient heat to sustain the reaction once it has been initiated. The demands of a large reaction kettle, heating and cooling controls, heaters, and stirrers call for a large financial investment in the reaction apparatus. Supervision and control of the process further require considerable operator attention so that the manpower requirements for the industrial process are high.

Once the prepolymerization reaction of the polyurethane adhesive has subsided, the product must be transferred to suitable drums, cans, pails or other containers for storage and use. During the prepolymerization reaction and during transfer and storage, good urethane polymer practices of blanketing the materials with dry air or nitrogen must be observed, and all containers and utensils require scrupulous cleaning and drying.

The polyurethane adhesive being a one-component, moisture cured system, is highly reactive to moisture. Containers must be sealed to protect the contents from atmospheric moisture. Once a container is opened for use, the entire contents must be protected from moisture with a dry nitrogen blanket, or by means of an air-drying train. The air-drying train may use such well-known drying agents as anhydrous calcium sulfate, anhydrous silica gel, anhydrous magnesium perchlorate, molecular sieves, etc. When small quantities are to be used, it may be more convenient to prepare the adhesive in containers sized to hold the desired quantity. The adhesive can then be used directly from the small containers without substantial waste.

This technology is well known in the prior art, and the general principles involved are explained in "The Development and Use of Polyurethane Products", by E. N. Doyle, McGraw-Hill Book Company, 1971 and in "Organic Polymer Chemistry", by K. J. Saunders, Chapman and Hall, 1973.

Catalysts for hastening the reaction of polyols and isocyanates are known, and are either generally organometallic or diamine catalysts, although other materials such as alkaline compounds have also served as catalysts to some degree. However, it is believed that because of the extremely close control of the reaction conditions for adhesive applications no successful catalyst initiated polyurethane prepolymer adhesive of the type discussed herein has been commercially available. Also, the ratio of NCO to OH groups must be controlled to obtain the desired bonding and handling properties for the adhesive.

The present invention provides a simple method for producing catalyst initiated polyurethane prepolymer adhesive under convenient room temperature conditions and in convenient volume containers for storage and application in industry. The proper sequence of adding and mixing the required components and the proper amount and type of catalyst are important aspects of the present invention for obtaining an adhesive system with strong bonding characteristics and good "pot life". To produce an adhesive with good bonding properties and physical characteristics the ratio of NCO to OH groups must be controlled and the mixing container must be clean and free of moisture and other contamination.

BRIEF SUMMARY OF THE INVENTION

This invention is directed to a process for manufacturing a polyurethane prepolymer adhesive at room temperature and in convenient amounts for utilization in industry. Polyurethane adhesives are suitable for joining various type materials including porous material. Many porous materials of differing compositions must be joined in industry, including paper, cardboard, wood, foamed plastics, fabrics and various laminates. Application for polyurethane adhesive may be found in manufacturing of cushions for automobiles, carpet, furniture, and fabric products. Thus, there is a large demand for polyurethane prepolymer adhesive in industry.

The present process involves mixture of a polyol, such as a polymeric diol, triol, or tetrol and any isocyanate, such as a diisocyanate. A catalyst is added, to initiate the reaction between the polyol and the isocyanate, initially at room temperature. The reaction heat accelerates the rate of reaction further, and care must be taken in determining the proper amount of catalyst, in order to adequately induce reaction without allowing high temperatures which could produce undesirable side reactions. Upon completion of the initial reaction, additives may be introduced, including plasticizers and reaction inhibitors to extend "pot life" and storage life of the prepolymerized adhesive. Plasticizers, fire retardants and other chemically inert additives may be added in part, or in whole, to the polyol-isocyanate mixture before catalyst addition, but this dilution of the main reactants requires greater amounts of catalyst to ensure proper reaction. Reaction inhibitors and other additives that may be consumed, or altered, by the polyol-isocyanate reaction, or that may have an effect on the reaction, are added after the prepolymer-forming reaction is completed.

Special thermally activated reaction catalysts and prepolymer-stable surfactants can also be added to the "finished" prepolymer. The latter catalysts provide better control by delaying the catalytic action until a predetermined temperature is reached. The advantage of adding these ingredients to the prepolymer is that the exact amounts of catalyst and surfactant needed for optimum reaction of the prepolymer with water for forming the foamed adhesive will be present in the prepolymer, and not subject to operator error, as is the case wherein the catalyst and surfactant are added with water separately.

The reaction and introduction of ingredients is carried out in a suitably sized container, such as a large drum or barrel, which may be conveniently stored, transported and utilized, for example in the mass production of adhesively bonded materials.

A primary object of this invention is to provide a process for the manufacturing of polyurethane prepolymer adhesive under convenient room temperature conditions.

A further object of this invention is to provide a process for the manufacturing of polyurethane adhesive in convenient amounts, to allow for use of simple equipment and convenient size reaction vessels which may be also suitable for transport, storage, and application purposes.

A further object of this invention is to provide for the further extension of "pot life" during application, and storage life of polyurethane prepolymer adhesive by the use of reaction inhibitors.

A further object of this invention is to provide for viscosity and hardness adjustments of polyurethane adhesive.

A further object of this invention is to provide for exact control of the foam-forming catalysts and surfactants by inclusion of suitable surfactants and thermally activated catalysts in the prepolymer.

DETAILED DESCRIPTION OF THE INVENTION

The preferred process involves the introduction of at least one polymeric diol, triol, tetrol or other polyol into a convenient size reaction vessel, such as a 55 gallon drum or barrel, which has been scrupulously cleaned of potential contaminants and dried. It should be understood that while a 55 gallon drum has been selected, other larger or smaller containers could be used as required. At this stage a fire retardant compound may be optionally pre-mixed with the polyol to impart flame retardancy to the final polyurethane adhesive. Tris (beta chloroethyl) phosphate, sold by Stauffer Chemical Company under the name of FYROL CEF, is a preferred fire retardant. A plasticizer may be optionally premixed with the polyol at this stage to help control the viscosity of the reaction mixture. A preferred plasticizer is a high aromatic content oil such as Bearflex LPO sold by The Golden Bear Division of Witco. A co-catalyst, such as a short chain polyfunctional alcohol or an alcohol amine may also be added to the polyol mixture at this stage. The polyol mixture is stirred to give a uniform, unstratified mixture. In all operations of the subject process, standard urethane practices must be observed in order to keep the reactants and prepolymer adhesive free of moisture and other contaminants. Atmospheric moisture is preferably removed from the reaction vessel by purging with dry air or nitrogen, and maintaining a moisture free atmosphere within the reaction vessel.

At least one isocyanate, such as a diisocyanate, including toluene diisocyanate (TDI), methylene diisocyanate (MDI), isophorone diisocyanate (IPDI), hexamethylene diisocyanate (HDI), or a polyphenylisocyanate is then added to the polyol mixture. It is desirable to add the isocyanate to the polyol mixture so as to avoid contact with atmospheric moisture and to uniformly mix the isocyanate and polyol component. The mixture is stirred to form a uniform mixture and then a measured amount of catalyst is introduced into the reaction vessel, with vigorous stirring. Tin catalysts such as dibutyl tin dilaurate (DBTDL) have been used effectively with combinations of a diol and/or a triol and TDI or MDI; while mercury catalysts such as di (phenylmercuric) dodecenyl succinate, have been effectively used with combinations of a triol and TDI or MDI.

The catalyst brings about a reaction between the polyol and isocyanate, initially at room temperature. The heat of reaction accelerates the rate of reaction further. A relatively minute amount of catalyst is required, and extreme care must be taken to determine the proper amount, so that the temperature of the reactants does not become so high that undesirable side reactions will occur, but will be high enough to allow the reaction to reach completion within a period of from 2 to 8 hours. The preferred choice of a catalyst or combination of catalysts depends upon the choice of polyol and isocyanate.

A preferred catalyst is DBTDL which degrades in potency rapidly upon exposure to moist air. To determine the amount of catalyst to be used a few (3 or 4) small predetermined volume samples of the polyol and isocyanate mixture are taken from the reactor. A first estimate of the amount of DBTDL is added to the unreacted resin sample and a thermometer is inserted to accurately measure the temperature change. If the temperature begins to rise substantially (e.g. about 2 degrees F.) in about 5 minutes and reaches a 5 to 10 degree F. temperature rise in about 10 minutes the amount of catalyst to be added to the entire unreacted batch can be determined on a proportional basis from that required for the sample. If the amount of initial catalyst causes the temperature to rise too quickly (e.g. more than 2 degrees F. in 30 seconds to 1 minute) or too slowly (e.g. less than 5 to 10 degrees F. in 10 minutes) the amount of catalyst should be adjusted accordingly in subsequent samples until the desired temperature rise of about 5 to 10 degrees F. is achieved in a 5 to 10 minute time span.

The reaction vessel in the preferred process is then purged with a dry non-reactive gas such as dry gaseous nitrogen or dry air and sealed to prevent contamination of the contents by atmospheric moisture or other contaminants. The drum is then placed on a drum roller, or any other suitable mixing apparatus, to mix the reactants continuously. This may be left mixing overnight without constant surveillance. After a period of approximately 2 to 8 hours, the reaction will have subsided, and additives such as plasticizer, colorant, anti-ozonants, reaction inhibitors, delayed action water-reaction catalysts, and surfactants may be added as desired. In the preferred process light petroleum oil, an aromatic oil plasticizer, and a reaction inhibitor have been found to extend the "pot life" of a batch of adhesive up to 4 hours while it is exposed to the atmosphere for application purposes, and to extend storage life of the prepolymer adhesive in the container as well. Plasticizer additives control the viscosity of the prepolymer adhesive and the flexibility of the finished polyurethane adhesive bond. The reaction inhibitor may be any Lewis acid or potential acid which may be compatible with the system. In the preferred process, for example, benzoyl chloride, acetyl chloride, and acetic anhydride have been used successfully.

In the manufacture of adhesively bonded parts, the prepolymer mixture is reacted with a solution of a basic catalyst and surfactant in water. Separate application of the prepolymer and water/catalyst solution can result in widely different ratios of prepolymer to water/catalyst solution applied to the foam layer, which may cause unpredictable variations in the quality of the adhesive bond, and in overuse of the water/catalyst solution. Both conditions are expensive; the former by causing rejected parts and the latter by using excessive amounts of expensive catalyst and surfactant. As an alternative, a delayed action catalyst such as DABCO TAC (a hydroxylated quaternary ammonium carbonate described in U.S. Pat. No. 4,040,992 and manufactured by Air Products and Chemicals, Inc., Allentown, Pa.) and a surfactant compatible with the prepolymer such as L-5340 (a non-hydrolyzable silicone surfactant consisting of polysiloxane polyoxyalkylene block copolymers similar to those described in U.S. Pat. Nos. 2,834,748 and 2,917,480 and is manufactured by Union Carbide Chemicals and Plastics, New York, N.Y.) or LK-211 and LK-443 (each are all-organic surfactants derived from polyols similar to those described in U.S. Pat. No. 3,746,663 and are manufactured by Air Products and Chemicals, Inc., Allentown, Pa.) can be mixed with the prepolymer, along with the plasticizer, reaction inhibitors, etc., in the precise amounts that cause optimum reaction and foam-forming when the prepolymer is mixed with water and heated. Once the prepolymer adhesive has been prepared, the reaction vessel drum may be again sealed for storage or transport.

The ratios of available active isocyanate (NCO) groups of the isocyanate to OH or other hydroxyl groups are critical to the achievement of the end adhesive properties desired. Excess active isocyanate in the prepolymer will react with water available from atmospheric moisture or the moisture contained in the material to be bonded. The isocyanate will also react with nearly any compound having an active hydrogen. Reaction with water gives carbon dioxide and urea compounds, which will further react to form biuret compounds, cross-linking the polyurethane adhesive to form a strongly bonding adhesive. It has been determined that the present process gives the best results with the polyurethane prepolymer having an excess of available NCO in amount of 5% to 20% by weight. The hardness of the adhesive increases with the percentage of excess NCO. For most commercial bonding and handling applications excess NCO of about 8 to 11.5% gives excellent results. Excess isocyanate as low as 2% by weight has been used but with relatively poor adhesion and flow properties. An increase in the amount of additives, such as plasticizers may be compensated for by a decrease in the amount of polyol, leaving the available NCO in the desired excess weight percent in the polyurethane prepolymer adhesive.

Examples of the specific polyols which may be used in the preferred process include dipropylene glycol, polypropylene glycol (PPG), polyethylene glycol, polybutadiene glycol, polyethylene triol, and polypropylene triol. Examples of the specific isocyanates which may be used in the preferred process include diphenyl methane diisocyanate (MDI); polymethylene polyphenylisocyanate (polymeric MDI); 2, 4 toluene diisocyanate (TDI); 2, 6 TDI; hexamethylene diisocyanate and isophorone diisocyanate. A typical commercial mixture of 80/20 of 2, 4 and 2, 6 TDI is used in the United States and can be used in the present process. Examples of specific co-catalysts in the preferred process are Lewis bases which include triethylenediamine; N, N, N', N'-tetrakis (2-hydroxypropyl) ethylenediamine (for example "Quadrol" manufactured by BASF Wyandotte of Wyandotte, Mich.); and dimethyl ethanolamine (DMEA).

The following examples illustrate the manner in which polyurethane prepolymer adhesive may be prepared, using the process which is the subject of this invention, showing the preferred proportions of the ingredients involved. It should be understood that the amount of catalyst will vary slightly from batch to batch depending upon the catalyst and its potency (age related); therefore, the amounts of catalyst listed are based upon catalyst having average potency. The amount of catalyst for each batch should be determined by using the simple technique discussed above.

EXAMPLE 1

A polyurethane prepolymer adhesive is prepared having an excess NCO content of 11.5 percent by weight using the steps described above, at room temperature, in a 55 gallon drum, using a dry nitrogen purge and blanket over the ingredients, in the following proportions, in parts by weight (except where otherwise specified):

| COMPONENTS | QUANTITY | WEIGHT % |
| --- | --- | --- |
| Polypropylene glycol (for example, PPG-2025, manufactured by Union Carbide) | 101.2 lb. | 22.47 |
| tris(beta chloroethyl)phosphate (for example, FYROL CEF, produced by Stauffer Chemical Company) | 40.5 lb. | 8.99 |
| N, N, N', N'—tetrakis(2-hydroxypropyl) ethylenediamine (for example, QUADROL, produced by BASF Wyandotte Corporation) | 1.3 lb. | 0.29 |
| polymeric MDI (polymethylene polyphenylisocyanate: for example, MONDUR-MR, from Mobay Chemical or PAPI from Upjohn Polymer Chemicals) | 178.4 lb. | 39.61 |
| dibutyl tin dilaurate (for example, FOMREZ SUL-4, made by Witco Chemical Corporation) | 0.088 lb. | 0.02 |
| light petroleum oil (for example, BEARFLEX LPO, a substantially aromatic oil made by Witco Chemical Corporation) | 128.5 lb. | 28.53 |
| Benzoyl chloride | .44 lb. | .09 |

The ethylenediamine co-catalyst is mixed with the phosphate fire retardant, and a molecular sieve (or other drying agent) is used to withdraw excess water (if present) from the co-catalyst, which has an affinity for water. Prior to addition of the catalyst DBTDL, a 150 gram sample of the polyol-isocyanate resin mixture is taken to determine the amount of catalyst needed to produce a 10 degree F. temperature rise in about 5 to 10 minutes. After about two to eight hours and depending upon ambient conditions, the temperature of the reaction vessel should drop to near room temperature, and the light petroleum oil plasticizer and benzoyl chloride reaction inhibitor are added.

EXAMPLE 2

Example 1 is repeated using a combination of isocyanates, giving an adhesive having an excess NCO content of 11.5 percent by weight.

| COMPONENTS | QUANTITY | WEIGHT % |
| --- | --- | --- |
| polypropylene glycol | 100 lb. | 22.75 |
| tris(beta chloroethyl)phosphate | 40 lb. | 9.10 |
| light petroleum oil | 127 lb. | 28.89 |
| N, N, N', N'—tetrakis(2-hydroxypropyl) ethylenediamine | 1.3 lb. | 0.30 |
| dibutyl tin dilaurate | 0.2 lb. | 0.05 |
| polymeric MDI/TDI; 20/1 mixture | 170.6 lb. | 38.81 |
| benzoyl chloride | .44 lb. | .10 |

EXAMPLE 3

Example 1 is repeated with a greater amount of light petroleum oil, and polymethylene polyphenyl isocyanate to produce an adhesive having an excess NCO content of 11.5 percent by weight.

| COMPONENTS | QUANTITY | WEIGHT % |
| --- | --- | --- |
| Polypropylene glycol | 100 lb. | 17.48 |
| tris(beta chloroethyl)phosphate | 40 lb. | 6.99 |
| N, N, N', N'—tetrakis(2-hydroxypropyl) ethylenediamine | 1.3 lb. | 0.23 |
| polymeric MDI | 230 lb. | 40.21 |
| dibutyl tin dilaurate | .2 lb. | 0.03 |
| light petroleum oil | 200 lb. | 34.96 |
| benzoyl chloride | .56 lb. | 0.10 |

This polyurethane prepolymer adhesive is less viscous, being suitable for a spray application or a curtain coating.

EXAMPLE 4

Example 1 was repeated, using different proportions of isocyanate and plasticizer, and a triol instead of a glycol, giving the same excess NCO content of 11.5 percent by weight.

| BATCH A | | |
| --- | --- | --- |
| COMPONENTS | QUANTITY | WEIGHT % |
| polypropylene triol (for example Union Carbide's PPG 11-27) | 100 lb. | 34.81 |
| tris(beta chloroethyl)phosphate | 40 lb. | 13.93 |
| polymeric MDI | 146.6 lb. | 51.04 |
| dibutyl tin dilaurate | 0.20 lb. | 0.07 |
| light petroleum oil | 0.0 lb. | 0.0 |
| benzoyl chloride | .44 lb. | 0.15 |

| BATCH B | | |
| --- | --- | --- |
| COMPONENTS | QUANTITY | WEIGHT % |
| polypropylene triol (for example Union Carbide's PPG 11-27) | 100 lb. | 23.81 |
| tris(beta chloroethyl)phosphate | 40 lb. | 9.53 |
| polymeric MDI | 159.3 lb. | 37.93 |
| dibutyl tin dilaurate | 0.20 lb. | 0.05 |
| light petroleum oil | 120 lb. | 28.58 |
| benzoyl chloride | .44 lb. | 0.10 |

| BATCH C | | |
| --- | --- | --- |
| COMPONENTS | QUANTITY | WEIGHT % |
| polypropylene triol (for example Union Carbide's PPG 11-27) | 100 lb. | 30.73 |
| tris(beta chloroethyl)phosphate | 40 lb. | 12.29 |
| polymeric MDI | 124.8 lb. | 38.35 |
| dibutyl tin dilaurate | 0.20 lb. | 0.06 |
| light petroleum oil | 60 lb. | 18.44 |
| benzoyl chloride | .44 lb. | 0.13 |

EXAMPLE 5

This formulation makes a very soft adhesive bond, when cured. Example 1 is repeated using a polymeric triol of high molecular weight (5000 to 6000 g/mole) and having an excess NCO content of 8 percent by weight.

| COMPONENTS | QUANTITY | WEIGHT % |
| --- | --- | --- |
| polypropylene triol (for example, Pluracol Polyol 220, manufactured by BASF Wyandotte.) | 100 lb. | 31.48 |
| tris(beta chloroethyl)phosphate | 30 lb. | 9.44 |
| polymeric MDI | 87.0 lb. | 27.38 |
| dibutyl tin dilaurate | .40 lb. | 0.12 |
| light petroleum oil | 100.0 lb. | 31.48 |
| benzoyl chloride | .31 lb. | 0.10 |

EXAMPLE 6

Example 5 is repeated, with addition of a delayed action catalyst-DABCO TAC-and a surfactant that is compatible with the prepolymer, and added after the prepolymer is formed.

| COMPONENTS | QUANTITY | WEIGHT % |
| --- | --- | --- |
| Polypropylene triol | 100 lb. | 31.06 |
| tris(beta chloroethyl)phosphate | 30 lb. | 9.32 |
| polymeric MDI | 87.0 lb. | 27.03 |
| dibutyl tin dilaurate | .4 lb. | 0.12 |
| light petroleum oil | 100 lb. | 31.06 |
| benzoyl chloride | .31 lb. | 0.10 |
| hydroxylated quaternary ammonium carbonate (for example, DABCO TAC made by Air Products, Inc.) | 1.0 lb. | 0.31 |
| non-hydrolyzable silicone surfactant con- | | |

-continued

| COMPONENTS | QUANTITY | WEIGHT % |
|---|---|---|
| sisting of polysiloxane polyoxyalkylene block copolymers (for example, L-5340 made by Union Carbide) | 3.2 lb. | 1.0 |

EXAMPLE 7

Example of adhesive prepolymer prepared with other isocyanates:

| COMPONENTS | QUANTITY | WEIGHT % |
|---|---|---|
| polypropylene glycol | 100 lb. | 36.36 |
| tris(beta chloroethyl)phosphate | 28.5 lb. | 10.36 |
| hexamethylene diisocyanate | 142.1 lb. | 51.66 |
| toluene diisocyanate | 4.2 lb. | 1.53 |
| dibutyl tin dilaurate | 0.24 lb. | 0.09 |

It should be understood that this preferred process is subject to alterations and modifications, and to different combinations, and that this description of the preferred process is by way of example. For instance, at the stage where the prepolymerization reaction has been initiated, the drums may be appropriately sealed so as to allow insertion of stirring means within the drums. The fire retardant may be eliminated, reapportioning ingredients accordingly to give the desired excess NCO content by weight, and the amount of plasticizer adjusted to give the desired viscosity. Plasticizer and polyol could be pre-mixed, in the proportions desired, and the catalyst and co-catalyst ingredients could be added simultaneously. Mixtures of DMEA and triethylene diamine are commercially available (for example DABCO R8020 manufactured by Air Products and Chemicals, Allentown, Pa.) and mixtures of triethylenediamine and dipropylene glycol are available, which may be used, with appropriate apportionment of other ingredients. The amount of light petroleum oil plasticizer may be increased and polyol decreased to give the desired excess NCO content.

Although the present invention has been described in detail with reference to certain preferred and alternative process steps and equipment, it will be understood that certain modifications can be effected by those skilled in the art without departing from the scope of the invention described hereinabove and as defined by the following claims.

I claim:

1. A process for manufacturing a polyurethane prepolymer adhesive under room temperature conditions comprising the steps of:
   (a) introducing a predetermined amount of at least one polyol reactant into a reaction vessel;
   (b) mixing a predetermined amount of least one isocyanate reactant into the reaction vessel to give a uniform resin mixture sufficient to give an excess active isocyanate content in the polyurethane prepolymer adhesive of approximately 5% to 20% by weight;
   (c) adding a predetermined amount of catalyst to initiate reaction of the reactants in the reaction vessel, with vigorous stirring to give a uniform mixture, said predetermined amount of catalyst being sufficient to allow the reaction to substantially reach completion within 2 to 8 hours;
   (d) isolating the mixed contents in the reaction vessel from ambient conditions to prevent contamination of the contents by ambient moisture; and
   (e) mixing the reactants during the reaction in the reaction vessel until the reaction substantially subsides, whereby the polyurethane prepolymer adhesive is formed.

2. The process according to claim 1 further comprising the step of mixing into the polyol-isocyanate mixture a fire retardant.

3. The process according to claim 1 further comprising the step of mixing into the polyurethane prepolymer adhesive a reaction inhibitor.

4. The process according to claim 1 further comprising the step of mixing into the polyurethane prepolymer adhesive a plasticizer.

5. The process according to claim 1 further comprising the step of mixing into the polyol-isocyanate mixture a predetermined amount of a plasticizer, said predetermined amount ranging from 0–50%, by weight.

6. The process according to claim 1 further comprising the step of mixing into the polyurethane prepolymer adhesive a predetermined amount of a plasticizer, said predetermined amount ranging from 0–5%, by weight.

7. The process according to claim 6 wherein the delayed action catalyst is a hydroxylated quaternary ammonium carbonate.

8. The process according to claim 6 further comprising the step of mixing into a polyurethane prepolymer adhesive a predetermined amount of a surfactant, said predetermined amount ranging from 0–10%, by weight.

9. The process according to claim 1 further comprising the step of mixing into the polyurethane prepolymer adhesive a predetermined amount of a surfactant.

10. The process according to claim 8 or claim 9 wherein the surfactant is selected from the group consisting of polysiloxane polyoxyalkylene block copolymer surfactants and polyol derive organic surfactants.

11. The process according to claim 1 wherein the amount of catalyst is predetermined by a method comprising the steps of:
   (a) removing a 150 gram sample of the unreacted resin mixture from the reaction vessel;
   (b) adding an estimated amount of catalyst to the sample in a suitable vessel;
   (c) adjusting the estimated amount of catalyst to cause a temperature rise of the sample of 5 to 10 degrees F. within 5 to 10 minutes from the time of addition of catalyst to the sample; and
   (d) measuring the added amount of catalyst for the reaction vessel proportional to the amount of the sample which was determined in step (c).

12. The process according to claim 1 further comprising the step of mixing into the polyol reactant a predetermined amount of a co-catalyst, said predetermined amount ranging from 0–10%, by weight.

13. The process according to claim 1 wherein the excess active isocyanate content in the polyurethane prepolymer adhesive is in the range of approximately 5 to 20 percent by weight.

14. The process according to claim 1 wherein the step of isolating the mixed contents in the reaction vessel includes purging the contents of the reaction vessel with dry nonreactive gases.

15. The process according to claim 1 wherein the reaction vessel is a drum, and the step of mixing the reactants during the reaction is performed with a means for continuously rolling the drum.

16. The process according to claim 1 wherein the step of mixing the reactants during the reaction is performed by a means for stirring the reactants.

17. The process according to claim 3 wherein the reaction inhibitor comprises a Lewis acid.

18. The process according to claim 4 wherein the plasticizer comprises a light petroleum oil.

19. The process according to claim 1 wherein the catalyst is an organometallic compound.

20. The process according to claim 1 wherein the excess active isocyanate content in the polyurethane prepolymer adhesive is approximately 8 to 11.5 percent by weight.

21. The process according to claim 3 wherein the reaction inhibitor additive is selected from the group consisting of benzoyl chloride, acetyl chloride, and acetic anhydride.

22. The process according to claim 12 wherein the co-catalyst is treated with a drying agent to withdraw water from the co-catalyst.

23. The process according to claim 1 wherein the catalyst is selected from a group consisting of dibutyl tin dilaurate and di(phenylmercuric) dodecenyl succinate.

24. The process according to claim 1 further comprising the step of adding a predetermined amount of at least one co-catalyst to the polyol reactant, wherein the co-catalyst is a Lewis base selected from the group consisting of triethylenediamine, dimethyl ethanolamine, and N,N,N',N'-tetrakis (2-hydroxypropyl) ethylenediamine.

25. The process according to claim 1 wherein the polyol reactant is selected from the group consisting of dipropylene glycol, polypropylene glycol, polyethylene glycol, polybutadiene glycol, polyethylene triol and polypropylene triol.

26. The process according to claim 1 wherein the isocyanate reactant is selected from the group consisting of diphenylmethane diisocyanate; polymethylene polyphenylisocyanate; 2, 4 toluene diisocyanate; 2, 6 toluene diisocyanate; hexamethylene diisocyanate and isophorone diisocyanate.

27. The process according to claim 17 wherein the Lewis acid reaction inhibitor is selected from a group consisting of benzoyl chloride, acetyl chloride, and acetic anhydride, and the plasticizer comprises a light petroleum aromatic oil.

28. A polyurethane prepolymer adhesive manufactured by the process of claim 1.

29. A polyurethane prepolymer adhesive manufactured by the process of claim 6.

30. The process according to claim 1 wherein said predetermined amount of catalyst is added after said polyol reactant and said isocyanate reactant are mixed to give said uniform resin mixture.

* * * * *